United States Patent [19]

Le Corre

[11] Patent Number: 5,323,455
[45] Date of Patent: Jun. 21, 1994

[54] RINGER CIRCUIT, PARTICULARLY FOR A TELEPHONE SET

[75] Inventor: Jean-Luc Le Corre, Quimper, France

[73] Assignee: Matra Communication, Quimper, France

[21] Appl. No.: 77,108

[22] Filed: Jun. 16, 1993

[30] Foreign Application Priority Data

Jul. 2, 1992 [FR] France ................. 92 08152

[51] Int. Cl.[5] ............................................. H04M 1/00
[52] U.S. Cl. .................................... 379/373; 379/390; 379/395; 379/418
[58] Field of Search ................. 379/390, 373, 395, 418

[56] References Cited

U.S. PATENT DOCUMENTS

| 4,233,474 | 11/1980 | Hishinuma | 379/395 |
| 4,251,689 | 2/1981 | Hastings-James | 379/395 |
| 4,304,969 | 12/1981 | Walla | 379/395 |
| 4,309,574 | 5/1982 | Sublette et al. | |
| 4,750,203 | 6/1988 | Defretin | 379/390 |
| 4,827,503 | 5/1989 | Takato et al. | 379/418 |
| 5,099,513 | 3/1992 | Kim et al. | 379/374 |

FOREIGN PATENT DOCUMENTS

| 0134867 | 8/1983 | European Pat. Off. . |
| 8100657 | 8/1980 | World Int. Prop. O. . |
| WO81657 | 3/1981 | World Int. Prop. O. . |

Primary Examiner—James L. Dwyer
Assistant Examiner—Jacques M. Saint-Surin
Attorney, Agent, or Firm—Griffin Butler Whisenhunt & Kurtossy

[57] ABSTRACT

The ringer comprises a loudspeaker receiving signals from an amplifier, the amplifier having both a power supply input connected to a ringer line providing a ringer signal via a chopper power supply means, and a melody input which is connected to the ringer line via a regulation unit that provides an image signal representative of the power of the ringer signal, and via a transformation unit that transforms the image signal by means of a melody signal applied to a terminal.

3 Claims, 1 Drawing Sheet

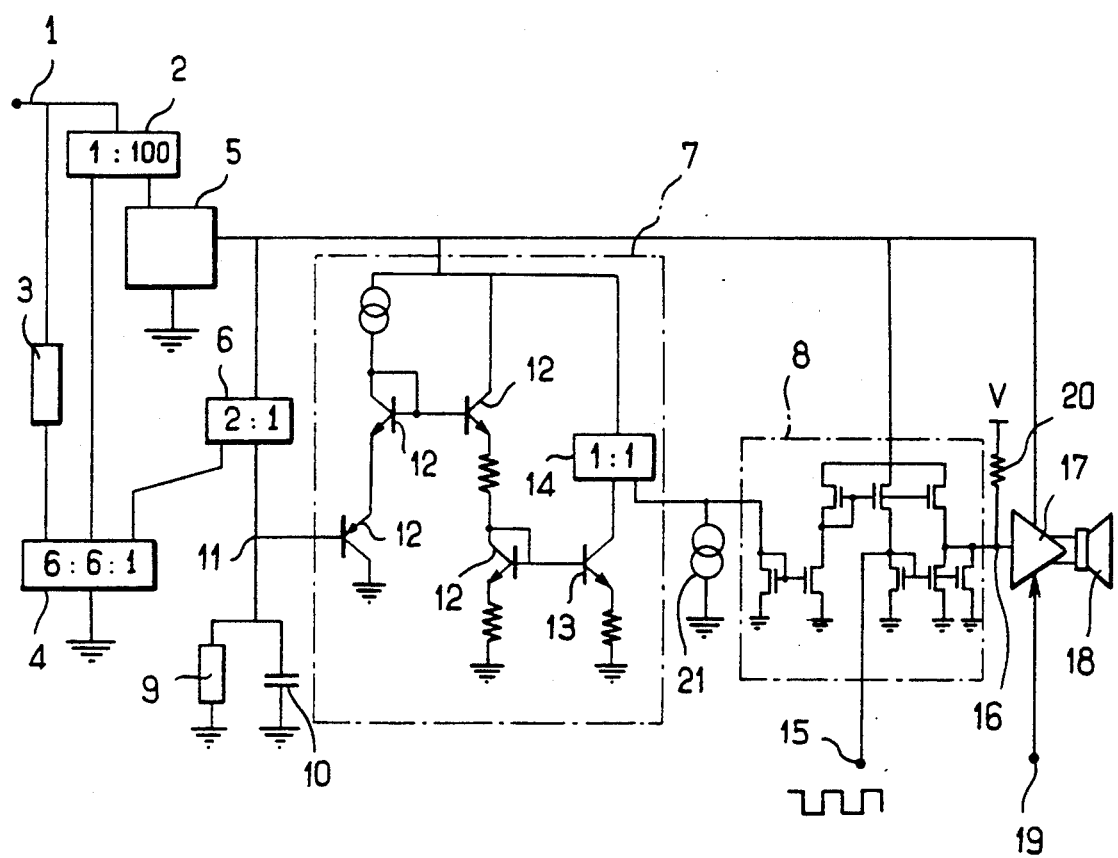

RINGER CIRCUIT, PARTICULARLY FOR A TELEPHONE SET

The present invention relates to a ringer circuit, particularly, but not exclusively, a ringer circuit for a telephone set.

BACKGROUND OF THE INVENTION

Known ringer circuits comprise a loudspeaker receiving signals from an amplifier, the amplifier having a melody input which receives a melody signal, and a power supply input connected to a ringer line which provides a ringer signal that is derived, via chopper power supply means, from the ringing current output by the telephone exchange. The melody signal current varies between maximum and minimum values which are constant and which cause the amplifier to operate in saturation. The operation of such circuits poses many problems. A first problem consists in obtaining sufficient acoustic power, i.e. at least equal to a required minimum, when the ringer signal is at its nominal voltage, while still ensuring satisfactory operation when the voltage of the ringer signal is below its nominal value. It has been observed that, when suitably adjusted for a ringer signal of nominal voltage, for example of the order of 80 volts, existing circuits have a tendency to emit a sound of acoustic power that varies due to lack of electrical power whenever the voltage of the ringing signal from the exchange is low, for example of the order of 25 volts, as happens in particular when the telephone set is connected to a long line with two or three other telephone sets in parallel. This phenomenon of varying acoustic power is referred to as "motorboating". This problem is becoming worse nowadays because the standards for ringer signal voltage vary according to country, so that a ringer circuit which is properly adjusted for the standards of one country may be poorly adjusted for a neighboring country. It is therefore now necessary to provide ringer circuits which differ considerably according to country.

A second problem consists in obtaining linear variation in the emitted acoustic power when the ringer circuit is connected to a unit for setting loudness, such a unit usually acting on the gain of the amplifier. In existing circuits that do not take the power of the ringer signal into account, loudness is allocated with respect to the power available at the nominal voltage of the ringer signal, so that if the ringer signal is not at its nominal voltage, then the available power is completely used up at low loudness settings and a change in setting tending to increase loudness above the level corresponding to the available power has no effect on the acoustic power provided by the loudspeaker, or may even give rise to motorboating, since the power demanded is then much greater than the power available.

OBJECT AND SUMMARY OF THE INVENTION

The object of the invention is to resolve, or in any case to minimize, these problems with a ringer circuit which is directly adapted to the standards of different countries or which may easily be adapted to the particular standards of a country.

To achieve this object, the invention provides a ringer circuit of the above-described type, and including a regulation unit giving an image signal representative of the power of the ringer signal, which regulation unit is connected to a transformation unit ensuring transformation of the image signal by the melody signal and delivering the resulting transformed signal to the melody input of the amplifier.

Thus, in contrast to prior art units, the minimum and maximum values of the melody current at the amplifier input vary as a function of the power available from the ringer signal, so that the power demanded by the amplifier from its power supply input connected to the ringer line is always proportional to the available power and therefore does not give rise to motorboating, even at a maximum setting of the amplifier gain. Moreover, when the amplifier includes an input for setting loudness, the maximum loudness setting automatically corresponds to the maximum power then available from the ringer signal, so intermediate loudness settings therefore continue to correspond to acoustic powers being delivered by the loudspeaker that are attenuated relative to the maximum power it can then deliver when set to maximum loudness, irrespective of whether setting is performed in a continuous manner by means of a potentiometer or whether it is performed in predetermined steps by connection to a logic circuit for selecting the loudness.

According to an advantageous aspect of the invention, the regulation unit includes a regulation resistor mounted in shunt across the ringer line and connected to the line via current mirrors. Thus, a voltage is obtained at a terminal of the regulation resistor which is representative of the power of the ringer signal, while nevertheless being at an impedance that is independent of the ringer line.

According to another advantageous aspect of the invention, the ringer unit includes a voltage-to-current converter connected between the regulation resistor and the transformation unit. Thus, the regulation voltage across the regulation resistor is converted into a regulation current which is easily transformed by the melody signal current in the transformation unit.

According to a preferred embodiment of the invention, the ringer unit includes a current source taking current from between the voltage-to-current converter unit and the transformation unit. Thus, optimum setting of the ringer unit is obtained by setting the current source so as to suppress any motorboating at the loudspeaker under minimum voltage conditions of the ringer signal.

According to a further advantageous aspect of the invention, the unit includes an adjusting resistor connected in shunt across the ringer line, between the ringer line and a current mirror.

According to a still further advantageous aspect of the invention, the ringer unit includes a capacitor connected in parallel across the regulation resistor. This suppresses the residual alternating voltage in the ringer signal that cannot be completely eliminated by the filters disposed upstream from the ringer unit without unduly delaying the appearance of a sound from the loudspeaker.

DESCRIPTION OF THE DRAWING

Other features and advantages of the invention will be apparent from the following description of one particular non-limiting embodiment of the ringer circuit according to the invention, with reference to the single accompanying drawing which is a schematic diagram of this embodiment.

With reference to the figure, the ringer circuit according to the invention comprises a ringer line 1 providing a ringer signal in the form of a ringing voltage that has been rectified and filtered by conventional means (not shown) disposed upstream from the ringer line 1. The ringer line is connected to a current mirror 2 with a ratio of 1:100, and also to an adjusting resistor 3 which is connected to a second current mirror 4 with three inputs in the ratio 6:6:1, the adjusting resistor 3 being connected to one of the terminals having a value of 6. The terminal of current mirror 2 which has the value 1 is connected to the second terminal of current mirror 4 which has the value 6. The terminal of current mirror 2 which has the value 100 is connected to a chopper power supply 5 of conventional design which is not shown in detail in the figure.

The output of chopper power supply 5 is connected to a third current mirror 6, to a voltage-to-current converter unit 7, and to a modulation or "transformation" unit 8. The terminals of the current mirror 6 are in the ratio 2:1, the terminal of value 2 being connected to the terminal of current mirror 4 which has the value 1, whereas the terminal of current mirror 6 which has the value 1 is connected to a regulation resistor 9, whose other terminal is connected to ground. A capacitor 10 is connected in parallel across the regulation resistor 9 and serves to filter the residual component at twice the ringing frequency which has not been eliminated completely by filter components upstream of the ringer circuit. The voltage appearing at the junction 11 of the regulation resistor 9, the capacitor 10, and the current mirror 6, which voltage is called herein the "regulation" voltage, is proportional to the voltage of the ringer signal in the ratio of the resistance of the regulation resistor to the resistance of the adjusting resistor, and also in the combination of the ratios of the current mirror circuits, this proportion being one-twelfth in the embodiment shown.

The regulation voltage is supplied to the voltage-to-current converter 7 which comprises four transistors 12 connected so that the base-emitter junctions of these transistors are compensated in the ranges over which the voltage of the ringer signal varies. A transistor 13 is connected by its base to the base of the final transistor 12 and by its collector to a current mirror circuit 14 of ratio 1:1 so that the regulation current produced at the output of the voltage-to-current converter 7 is proportional to the regulation voltage. This current is therefore an image signal representative of the power available in the ringer signal. The regulation current is supplied to the transformation unit 8 which comprises a circuit of MOS transistors connected to an input terminal 15 which receives a melody signal from a logic circuit (not shown). The transformation unit 8 therefore provides transformed regulation current which is thus fed with positive or negative sign and at the frequency of the melody signal, to the melody input 16 of an amplifier 17, where output is connected to a loudspeaker 18. Amplifier 17 also includes a power supply input directly powered by the ringer signal and a power supply input connected to a terminal 19 which receives a loudness setting signal provided by conventional means (not shown), for example a potentiometer or a logic circuit comprising a stepwise selection unit.

The input 16 of amplifier 17 is connected in known manner to a reference voltage V via an input resistor 20.

In the preferred embodiment shown, the ringer circuit also comprises a current source 21 which takes current from between the voltage-to-current converter 7 and the transformation unit 8 so as to optimize the circuit as described below.

For any given country, the resistance of resistor 3 is chosen to ensure that the ringer circuit has a minimum impedance conforming to the standards of the country concerned, and the resistance of resistor 9 is chosen as a function both of the resistance of resistor 3 and of the chosen type of loudspeaker, so that the image of available power which is provided at point 11 in the circuit is such that for a maximum gain of amplifier 17, the current delivered to loudspeaker 18 is not a saturation current, so that the variations in the loudness setting given by the setting signal applied to terminal 19 are translated into variations in the acoustic power delivered by the loudspeaker 18 whatever the loudness setting. The current source 21 is also chosen so that, under minimum operating conditions, i.e. with a minimum ringer signal voltage on line 1, sufficient current is taken from between the voltage-to-current converter 7 and the transformation unit 8 to ensure that the output signal from amplifier 17 is not subjected to motorboating. Under these conditions, the ringer circuit will function optimally over its entire operating range.

The invention is of course not limited to the embodiment shown, and variations can be made without departing from the scope of the invention as defined by the claims. In particular, the details of the voltage-to-current converter unit and the transformation unit are not critical and may be implemented by other means which provide the same functions. Similarly, the ratios of the current mirror circuits are not critical and may be adapted as a function of the kind of image signal required of the power available in the ringer circuit. Moreover, although the invention has been described in relation to an amplifier 17 including an input terminal 19 allowing the gain of the amplifier to be set, the invention is equally applicable to avoiding motorboating in a fixed-gain amplifier in spite of the power of the ringer signal varying.

Although provision has been made for adjusting the resistance of resistor 3 to meet the standards of each country, it may be noted that the ringer circuit of to the invention is sufficiently flexible in operation to be used in very different conditions, so that highly satisfactory operation may be obtained even when the resistance of resistor 3 is not exactly matched to the standards of a given country.

I claim:

1. A ringer circuit comprising a loudspeaker receiving signals from an amplifier including an input for setting a gain of the amplifier, the amplifier having a power supply input connected to a ringer line providing a ringer signal via a chopper power supply and a melody input receiving a melody signal, said chopper power supply being connected to the ringer line via a first current mirror connected to a second current mirror having one terminal connected to the ringer line via an adjusting resistor and another terminal connected to a third current mirror connected on one hand to an output of the chopper power supply, and on the other hand to a regulation resistor and an input of a voltage to current converter, said voltage to current converter having an output connected to an input of a transformation unit having another input receiving a melody signal and an output connected to the melody input of the amplifier.

2. A ringer circuit according to claim 1, including a current source taking current from between the voltage-to-current converter unit and the transformation unit.

3. A ringer circuit according to claim 1, including a capacitance connected in parallel across the regulation resistor.

* * * * *